Aug. 27, 1957  H. T. KINDER  2,804,277
FISHING ROD HOLDER AND HOOK SETTING DEVICE
Filed April 8, 1955
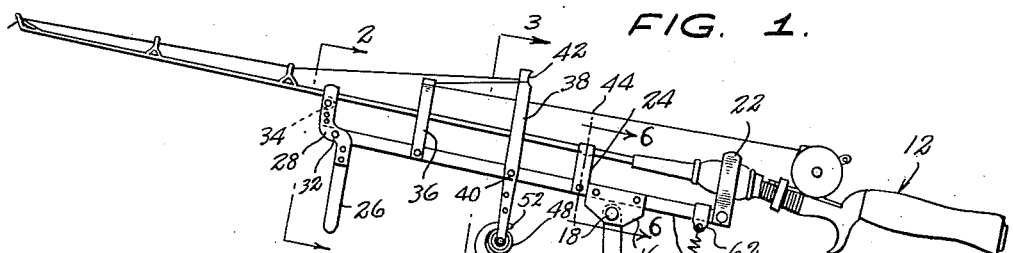
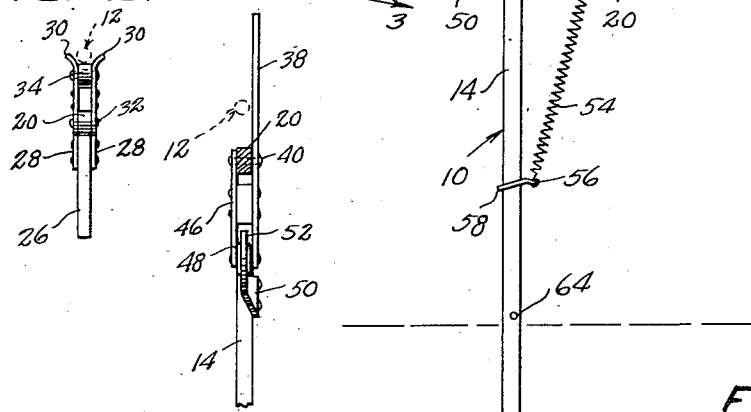
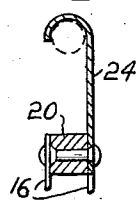
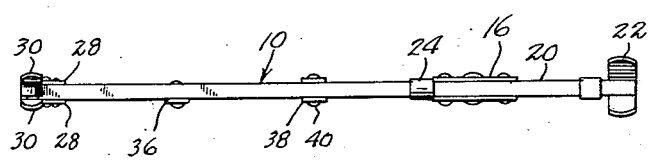
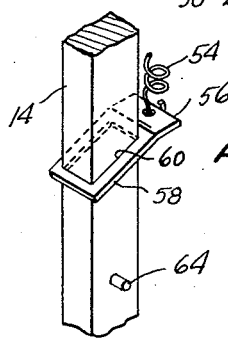
INVENTOR.
HOWARD T. KINDER,
BY
McMorrow, Berman & Davidson
ATTORNEYS.

United States Patent Office 2,804,277
Patented Aug. 27, 1957

2,804,277

FISHING ROD HOLDER AND HOOK SETTING DEVICE

Howard T. Kinder, Goodland, Kans.

Application April 8, 1955, Serial No. 500,122

1 Claim. (Cl. 248—42)

This invention relates to a fishing rod holder, so designed as to cause the hook to be set in the fish's mouth, when the fish takes the bait and exerts a pull upon the line extending from the rod.

An object of importance in the present invention is to provide a generally improved device of this type, which will have an improved triggering mechanism, capable of being released immediately when a fish takes the bait, by reason of its sensitivity to a predetermined amount of pull upon the fishing line.

Another object of importance is to provide a device as described wherein the rod can be engaged with or disengaged from the holder with maximum ease and facility, thus to permit a user to take the rod from the holder when the hook has been set in the fish's mouth, with a minimum of delay for the purpose of playing the fish and reeling it in.

Yet another object is to provide a device as described wherein the several component parts thereof can be adjusted to a "set" position, that is, a position awaiting pull on the line by a fish, with speed and ease.

Still another object is to provide a device as described in which, when the hook is to be set in the fish's mouth and the triggering mechanism is released, the rod will be swung upwardly to firmly set the hook, under the force of a spring, with the device including means facilitating adjusting of the spring tension without requirement of tools and with minimum difficulty.

Other objects will appear from the following description, the claims appended thereto, and from the annexed drawing, in which like reference characters designate like parts throughout the several views, and wherein:

Figure 1 is a side elevational view of the device formed according to the present invention, in association with a supported rod;

Figure 2 is an enlarged sectional view on line 2—2 of Figure 1;

Figure 3 is an enlarged sectional view on line 3—3 of Figure 1;

Figure 4 is a top plan view of the device with the rod removed; and

Figure 5 is a fragmentary perspective view, still further enlarged, showing the spring tension adjusting means.

Figure 6 is a sectional view taken on the line 6—6 of Figure 1.

The reference numeral 10 has been applied generally to the fishing rod support and hook setting device formed in accordance to the present invention, while the reference numeral 12 has been applied generally to a conventional fishing rod.

The device includes a vertical post, tipped at its lower end for engagement of the post in the ground surface. Post 14, at its upper end, is pivotally connected to a support bracket 16, by means of a pivot pin 18 extending transversely of the post 14.

Carried by the bracket 16 is a swingable support arm 20 formed as an elongated, straight bar, said arm swinging in a vertical plane about the axis of the pivotal connection 18 between a lower position shown in Figure 1, and an upper position in which the arm is inclined slightly from the vertical for the purpose of correspondingly swinging the rod 12 upwardly to set the hook in a fish's mouth.

The bar 20 is disposed below and in parallel relation to the rod, as shown in Figure 1, when the device is in use, and at one end, is provided with an upwardly projecting cradle or yoke 22 for the butt of the rod, said cradle engaging the butt forwardly of the reel. The cradle 22 can be formed of a pair of spring bars adapted to be spread responsive to insertion of the butt therebetween, said bars at their upper ends having divergent extremities for the purpose of facilitating insertion of the rod.

Immediately in front of bracket 16, there is riveted to the movable support bar 20, or otherwise fixedly secured to said support bar, an upwardly projecting hold-down hook 24, of inverted J-shape, the hook-like upper end of the hold-down element engaging over the rod.

At the forward end of the support bar 20, there is provided a rod release handle 26 depending from and fixedly secured to and between a pair of zig-zag bars 28, the upper ends of which diverge from one another as at 30 (Figure 2) so as to prevent said upper ends from binding against the rod 12. Adjacent their upper ends, the members 28 carry a roller 34, engageable against the underside of the rod a substantial distance forwardly of the hold-down element 24, and the members 28, intermediate their ends, are pivotally connected at 32 to the bar 20, for swinging movement in a vertical plane common to that in which the bar 20 itself swings.

It will be seen that to engage the rod upon the device, it is merely necessary that the handle 26 be pulled to the left in Figure 1, so as to swing the roller 34 through an arcuate path in a clockwise direction in Figure 1, thus lowering the roller. The rod may now be engaged under the hold-down hook and seated in the cradle 22, after which the handle 26 is swung to the right in Figure 1, causing the roller 34 to swing upwardly and bear against the underside of the rod, in a manner that exerts upward pressure against the rod forwardly of the hold-down element 24, to tightly engage the rod against the hold-down element and also against the roller, in position upon the bar 20.

Spaced rearwardly a short distance along the length of the bar 20 from the lever defined by the handle 26 and members 28 is an upwardly projecting snubber post 36 secured fixedly to bar 20 at one side thereof and extending normally to the length of the bar 20.

Between the snubber post 36 and the hold-down element 24 is a trigger member 38 formed as an elongated length of material fulcrummed intermediate its ends at 40 upon the bar 20, to swing in a plane parallel to the plane in which the bar 20 swings. At its upper end, the trigger member 38 has on its rear edge a shallow recess 42, receiving the line 44 of the fishing rod.

At the side of the bar 20 opposite from that on which the trigger member 38 is mounted, there is provided a short bar member 46, paralleling and transversely spaced from the lower portion of the trigger member 38 as shown in Figure 3 and connected by the pivot pin 40 at its upper end to the bar 20. Carried by and between the lower ends of member 38 and bar 46 is a roller 48, which would preferably be mounted on ball bearings to facilitate free rotation thereof.

A catch 50 is formed as an arm projecting forwardly, substantially horizontally, from the upper end portion of the post 14, said catch being formed at its outer, free end with an upwardly and inwardly turned hook 52 under which the roller 48 engages.

Connected between the post 14 and the rear end of the support bar 20 is an expansion spring 54, the lower end of which is hooked to an angular extension 56 (Figure 5) formed upon a rectangular connecting member 58 having a rectangular opening 60 receiving the post 14 and formed to a length slightly greater than the width of the post. At its other end, the spring is hooked to a spring connecting bracket 62, carried by the bar 20.

To prevent loss of the plate 58, there is provided a laterally projecting lug 64 upon the post 14 below the plate.

In use, the bar 20 is lowered to its Figure 1 position, being swung counterclockwise from its upper position about the pivotal connection 18. This places the spring 54 under tension, the pull of the spring upon the connecting plate 58 being adapted to cause said plate to shift into a plane oblique to the length of the post 14, thus to bind the plate against the post at a selected location along the length of the post. If it is desired that the spring tension be increased or decreased, the plate 58 is lowered or raised, as the case may be, so as to elongate or shorten the spring, whichever is desired, in the expanded condition of the spring.

The member 38 is swung to its Figure 1 position, to engage roller 48 under hook 52, and this will releasably retain the bar 20 in its lowered position, against upward swinging movement under the tendency of the spring 54 to contract.

The rod will be engaged with the bar 20 in the manner previously described herein, and the line is snubbed about the upper end of the snubber post 36, and about the upper end of the trigger 38.

When, now, a fish takes the bait and exerts pull upon the line with sufficient force, the upper end of the trigger 38 will be swung to the left in Figure 1, causing the roller 48 to move out of engagement with the hook 52. As a result, the spring is now free to contract, and will instantaneously and with considerable force pull downwardly upon the rear end of the bar 20, swinging the front end of the bar upwardly to a substantially upright position. This causes the rod to move to a corresponding position, thus setting the hook in the fish's mouth. Simultaneously, the line will become disengaged from the trigger 38 and the snubber post, since the trigger is now free to swing into substantial longitudinal alignment with the bar 20.

When the rod is swung to its upright position, this will provide a signal for the fisherman, and he need only grasp the rod, at the same time pulling the handle 26 to the left, to lower the roller 34. The rod may now be swiftly disengaged from the hold-down element 24 and cradle 22, by a slight downward and lateral movement of the rod, followed by an upward movement of the same out of the cradle. The fish may now be played and reeled in by the user, the rod being at this time wholly disconnected from the device.

It will be understood that instead of a spring, a rubber band or other contractile means may be employed, the spring being merely illustrative but not necessarily restrictive of a means employed for swinging the rod upwardly when the trigger mechanism is released.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claim.

What is claimed is:

A fishing support comprising an upstanding post; a bar mounted upon said post for supporting a fishing rod above the post; a cradle at one end of the bar adapted to receive the butt portion of a supported fishing rod; a hold-down element of inverted J-shape secured to the bar in spaced relation to the cradle for engaging over said rod; and means cooperating with the hold-down element to hold the rod in a supported position upon the bar, comprising a lever fulcrumed intermediate its ends upon the bar in spaced relation to the hold-down element, said lever including a pair of transversely spaced, identically formed bars having offset opposite end portions embracing the first named bar between them, said second named bars being pivotally connected to the first named bar for rocking movement about an axis extending transversely of the first named bar and having upper end portions extending above the first named bar and lower end portions extending downwardly from the first named bar, the lever further including a roller carried by and between the upper end portions of the second named bars and a handle fixedly secured to and between the lower end portions of the second named bars, said handle on swinging movement of the handle in one direction abutting the underside of the first named bar to limit swinging movement of the lever in said one direction beyond a position in which the roller is adapted to bear against the underside of a supported fishing rod and exert an upward pressure against the fishing rod, the lever when swung in an opposite direction being arranged to move the roller first upwardly and then downwardly over the center about which the lever swings so as to initially exert an increased upward pressure against the rod and then disengage the rod, said roller in the first named position of the lever exerting a constant upward pressure against the rod tending to hold the same in engagement with the hold-down element.

References Cited in the file of this patent

UNITED STATES PATENTS

| | | |
|---|---|---|
| 1,957,853 | Sibley | May 8, 1934 |
| 2,143,109 | Hadaway | Jan. 10, 1939 |
| 2,340,588 | Groves | Feb. 1, 1944 |
| 2,606,731 | Harris | Aug. 12, 1952 |
| 2,657,492 | Skorr | Nov. 3, 1953 |
| 2,725,206 | Rose | Nov. 29, 1955 |
| 2,744,351 | Smith | May 8, 1956 |

FOREIGN PATENTS

| | | |
|---|---|---|
| 106,259 | Sweden | Jan. 5, 1943 |